United States Patent [19]

Fournier, Jr. et al.

[11] Patent Number: 4,961,626

[45] Date of Patent: Oct. 9, 1990

[54] DIRECT INCORPORATION OF NIGHT VISION IN A HELMET MOUNTED DISPLAY

[75] Inventors: Joseph T. Fournier, Jr., Glastonbury; Stephen J. Smith, Simsbury, both of Conn.; Harry R. McKinley, Southampton, Mass.; William E. McLean, Aberdeen, Md.

[73] Assignee: United Techologies Corporation, Hartford, Conn.

[21] Appl. No.: 313,686

[22] Filed: Feb. 21, 1989

[51] Int. Cl.⁵ .................. G02B 27/14; G02B 23/12
[52] U.S. Cl. ................................ 350/174; 350/538; 350/545; 340/705
[58] Field of Search .............. 350/171, 174, 538, 545, 350/569; 340/705; 250/330

[56] References Cited

U.S. PATENT DOCUMENTS

| 4,361,384 | 11/1982 | Bosserman | 350/174 |
| 4,660,943 | 4/1987 | Ellis | 350/538 |
| 4,763,990 | 8/1988 | Wood | 350/320 |
| 4,775,217 | 10/1983 | Ellis | 350/538 |

Primary Examiner—Bruce Y. Arnold
Assistant Examiner—Ronald M. Kachmarik
Attorney, Agent, or Firm—Richard H. Kosakowski

[57] ABSTRACT

Helmet mounted display apparatus for use in aircraft and rotorcraft includes an first image source for generating images comprising pilotage symbol information, a second image source for sensing and generating images of the exterior scene, and relay optical components that optically superimpose the two images together and subsequently project the superimposed image into the observer's forward field of view.

47 Claims, 8 Drawing Sheets

DIRECT INCORPORATION OF NIGHT VISION IN A HELMET MOUNTED DISPLAY

This invention was made with Government support under a contract awarded by the Department of the Army. The Government has certain rights in this invention.

Technical Field

This invention relates to helmet mounted displays, and more particularly to a helmet mounted display directly incorporating night vision.

Background Art

The use of helmet mounted displays (HMDs) in modern high-performance aircraft and rotorcraft is well known. The increasing complexity of these crafts has led to an increased burden on the pilot to visually interpret flight data from a large number of sources. The HMD helps to alleviate this burden by providing in the pilot's forward field of view a display of information essential for the pilot's performance of such tasks as target acquisition and weapon delivery. The HMD allows him to spend more time piloting the craft in a head-up mode, i.e., looking out at the exterior scene and not looking down as often at the instrument panel.

The information displayed by the HMD typically consists of symbols relating to pilotage and weapon targeting. This symbol information is fed by the onboard flight computer to a cathode ray tube (CRT) image source. The CRT image is then projected through a series of optical components, typically including partially reflective/partially transmissive optical components located in front of the pilot's eyes. Viewing through the partially transparent components, sometimes referred to as a "combiner", the pilot is presented with a virtual image of the CRT image projected in his view of the exterior "real world" scene.

Depending on the ambient light conditions in which the pilot is flying, different requirements are placed on the optical design of the HMD. For the relatively high brightness daytime light (as compared to nighttime light), the combiner must have high transparency (see-through) since the pilot views the external scene as well as the projected symbol information. Consequently, the display source must have high brightness (e.g., a CRT written in the stroke mode) so as to produce enough contrast in the projected symbols.

Vision aids are required at night since flying by the "naked eye" is dangerous or impossible. In the prior art, pilots utilize image intensifier devices employed in Night Vision Goggles (NVGs). An advantage of the HMD is that the nighttime viewing function can be accomplished with the HMD optical system. for such use, the external scene may be sensed by, for example, image intensified television or forward looking infrared devices. The output of these devices is electronically processed and fed to an image projection source such as a raster mode CRT. The processing may also include the addition of symbol data to the sensed image of the exterior scene. The resulting CRT image is projected in the pilot's forward field of view through the HMD projection optical components.

A problem with these prior art HMDs arises from the night vision devices being typically mounted on gimbal platforms on the aircraft. The sensed image is transmitted to signal processing means in the cockpit that electronically combines the image with the desired symbol data. This electronic processing leads to added complexity and cost in providing for image storage, processing and transmission to the HMD.

A second problem arises with the prior art HMDs that is unique to night vision HMDs. When viewing a sensed image, it is desirable for the apparent image position in space to be properly maintained as the pilot moves his head. This feature is most desirable for angular head movements (as opposed to translational head movements). That is, the sensed image should track the head movement. Prior art head tracking systems employ a device attached to the helmet that senses angular head position with respect to an axis aligned with the pilot's forward field of view, and positions the gimbal-mounted night vision devices accordingly. However, a problem inherent in these head tracking devices is the amount of time it take the night vision devices to respond to the movement of the head. This inherent time lag may be critical in combat situations where the response time of the pilot in activating weapon systems depends on the image presented to him.

Disclosure of Invention

An object of the invention is to provide a HMD having a helmet mounted night vision sensor that senses the external scene and provides a visual image of the scene at an object surface thereof, the visual image being optically superimposed with symbol data from a CRT, the superimposed image being projected in the observer's forward field of view, whereby the resulting HMD avoids the inherent cost, complexity and time lag involved with prior art night vision HMDs.

According to the invention, helmet mounted apparatus for displaying an image in an observer's forward field of view includes a first image source, having an object surface, for generating optical signals indicative of a first visual image thereon, relay optics for projecting the first image along an optical path and into the observer's forward field of view, the relay optics having a predetermined back focus distance along the optical path from the first image source object surface to a first lens disposed along the optical path, a second image source, having an object surface, for generating optical signals indicative of a second visual image thereon, and a beamsplitter being disposed in the optical path between the first image source object surface and the first lens to transmit the optical signals indicative of the first image from the first image source to the first lens and being disposed to reflect the optical signals indicative of the second image into the optical path in a direction toward the first lens, the direction being equal to the direction of the optical signals from the first image source, the distance from the second image source object surface to the first lens equals the predetermined back focus distance, whereby the spatial disposition of the beamsplitter results in the superposition of the first and second optical signals, the superimposed image being projected by the relay optics into the observer's forward field of view.

These and other objects, features and advantages of the present invention will become more apparent in light of the detailed description of a best mode embodiment thereof, as illustrated in the accompanying drawing.

Best Mode for Carrying Out the Invention

Figure 1:
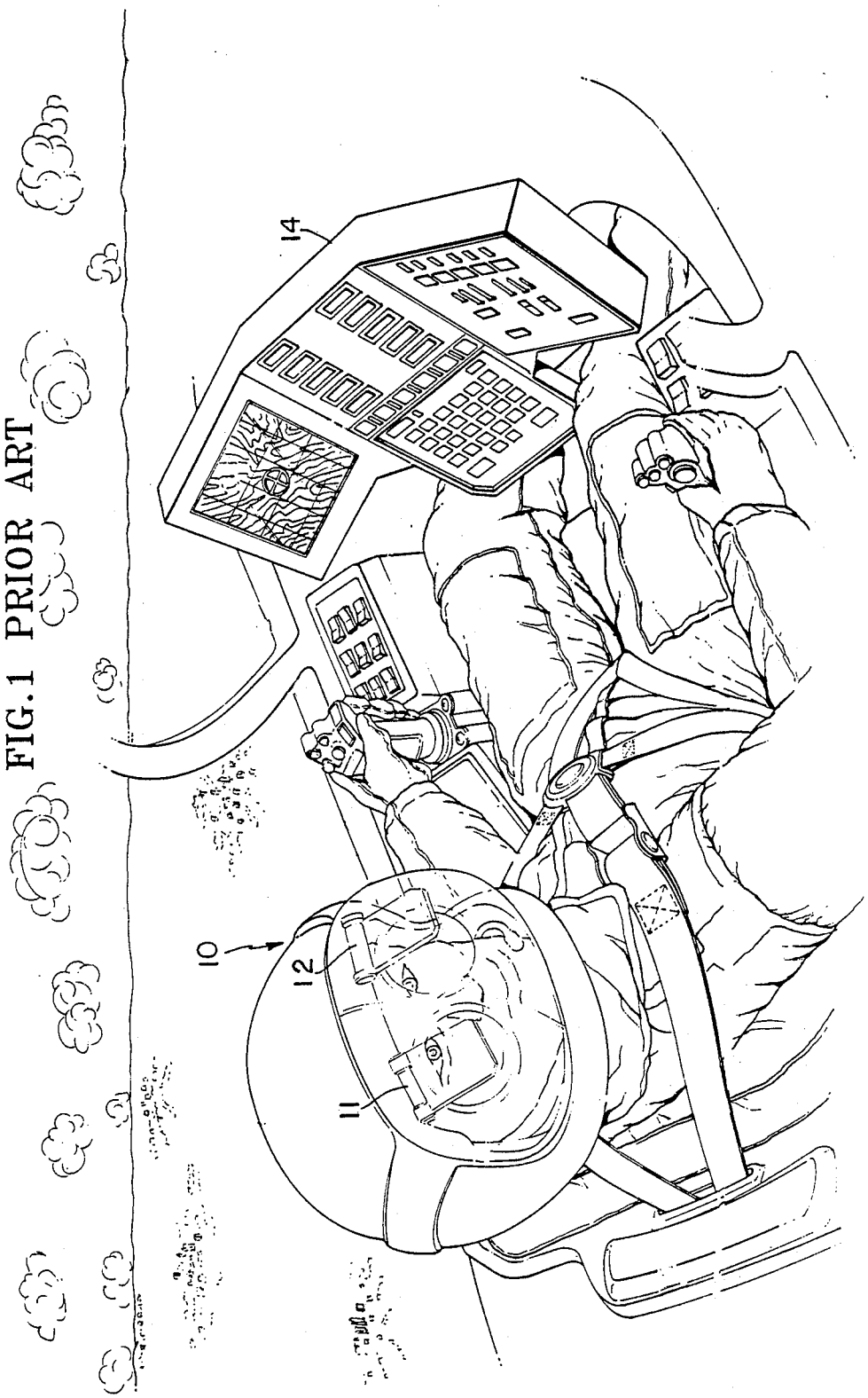
FIG. 1 illustrates a perspective view of a pilot of a modern high-performance aircraft wearing helmet mounted display apparatus typical of that of the prior art.

FIG. 1 illustrates a perspective view of an aviator piloting a modern high-performance aircraft while wearing a helmet mounted display (HMD) 10 typical of that found in the prior art. In the HMD 10, flight information is viewed through partially transparent optical eyepieces 11,12 located along the pilot's forward line of sight The flight information is provided at the image surface of one or more CRTs (not shown) to a series of optical components (not shown) that relay the image to the eyepieces 11,12. The CRTs and projection optics can all be helmet mounted, or some portion of the display components can be located in the cockpit.

The HMD illustrated in FIG. 1 is solely for daytime light conditions. For low luminance nighttime conditions, the pilot desires an intensified image of the exterior scene so as to enable him to pilot the craft to the best of his ability. In this case, the pilot is required to remove the entire daytime HMD and replace it with an entire HMD designed for nighttime light conditions. This changeover can be awkward and dangerous when performed during flight.

Figure 2:
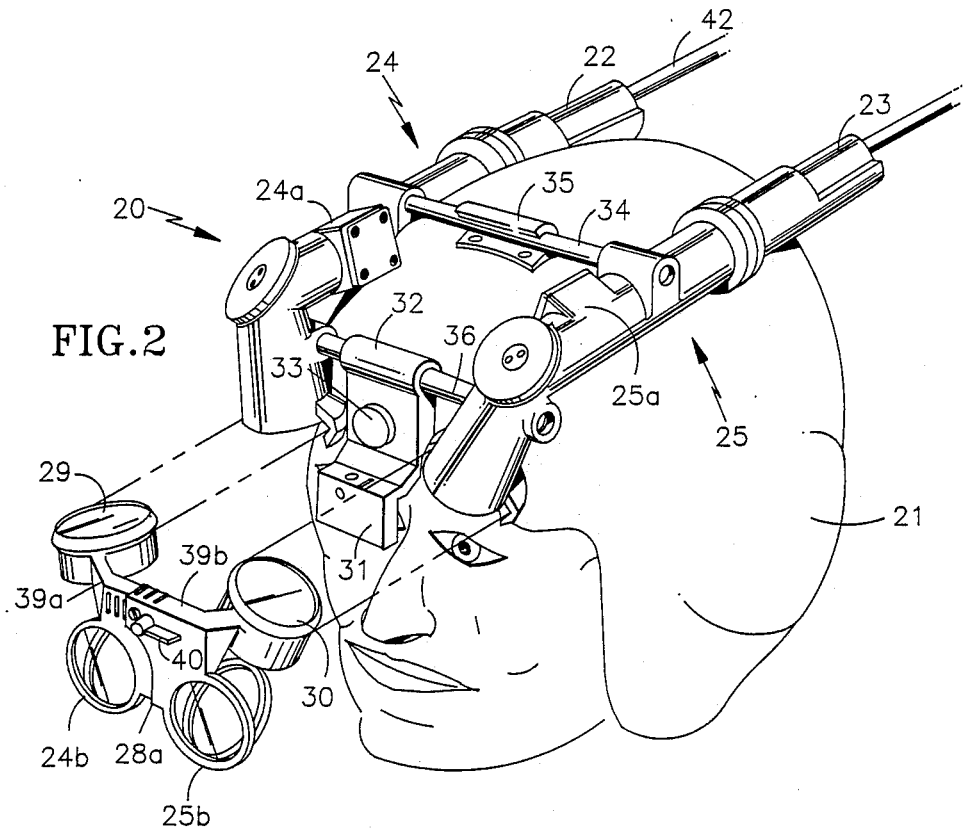
FIG. 2 illustrates a perspective view of HMD apparatus.

FIG. 2 illustrates a perspective view of a preferred embodiment of a HMD 20, in accordance with the invention as disclosed and claimed in a copending U.S. patent application of the same assignee entitled: A HELMET MOUNTED DISPLAY HAVING DUAL INTERCHANGEABLE OPTICAL EYEPIECES, U.S. patent application Ser. No. 313,685 filed on even date herewith by Fournier, et al. The HMD 20 mounts to the outer surface of a known type aviator's helmet 21, such as the model HGU55 provided by Gentex Corp. of California. The helmet provides an opening in the outer surface in proximity to the facial area. The HMD comprises two CRT image sources 22,23 together with a corresponding pair of identical relay optical component arrangements 24,25, one for each eye. Each CRT generates images of pilotage symbol information. The optical component arrangement is described in detail hereinafter with respect to the cross-sectional illustration of FIG. 3, and the optical ray diagrams of FIGS. 4,5.

Each arrangement 24,25 comprises, in part, a "relay optic" portion 24a,25a having optical components (not visible) enclosed in aluminum and used in both day and night HMD configurations. Each arrangement also comprises a daytime "eyepiece" portion 24b,25b having optical components optimized for daytime light conditions, and a nighttime eyepiece (not shown) 24c,25c having optical components optimized for nighttime light conditions. The daytime eyepieces 24b,25b mount in a first interchangeable binocular goggle assembly 28a, and the nighttime eyepieces 24c,25c mount in a second interchangeable binocular goggle assembly 28b (not shown). It is to be understood that the goggle assemblies 28a,28b are similar in structure; the difference lies in the optical components comprising the eyepiece portions as described in detail hereinafter with respect to FIGS. 4,5 and Tables I,II. FIG. 2 illustrates the HMD with the goggle assembly 28a separated from the helmet 21.

The goggle assembly mates with each relay optic portion 24a,25a by engagement slides 29,30. A known type, first ball detent 31 holds the goggle assembly to a mounting block 32 on the front of the HMD. The ball detent 31 and engagement slides 29,30 allow the pilot to quickly remove the goggle assembly from the helmet. The front mounting block 32 attaches to the front of the helmet using either a fixed screw mount or a second ball detent 33. A first rod 34 connects the two relay optic portions together. The rod 34 engages a hook 35 on the crown of the helmet. The second ball detent 33 and rod/hook 34/35 permit the pilot to quickly disengage the entire HMD 20 from the helmet 21.

A second rod 36 passes through the front mounting block 32 and connects to the two relay optic portions. The first and second rods 34,36 permit the relay optic portions to slide horizontally, thereby allowing the pilot to align the two relay optic portions for his particular eye spacing. This eye spacing is commonly referred to as the interpupillary distance (IPD). The second rod 36 has a knob (not shown) at one end to facilitate the IPD adjustment through a range of 58.9–73.3 mm, which is suitable for a wide range of pilot head sizes.

In order to allow IPD adjustment, the optical components of the eyepieces 24b,25b are mounted in segmented portions 39a,39b of the goggle assembly 28. The segmented portions 39a,39b slide relative to one another when a retaining screw 40 is loosened. Thus, to adjust the IPD, the pilot loosens the retaining screw 40 and adjusts the knob on the second rod 36 until the IPD is correct for his particular eye spacing. Then the pilot retightens the retaining screw.

Figure 3:
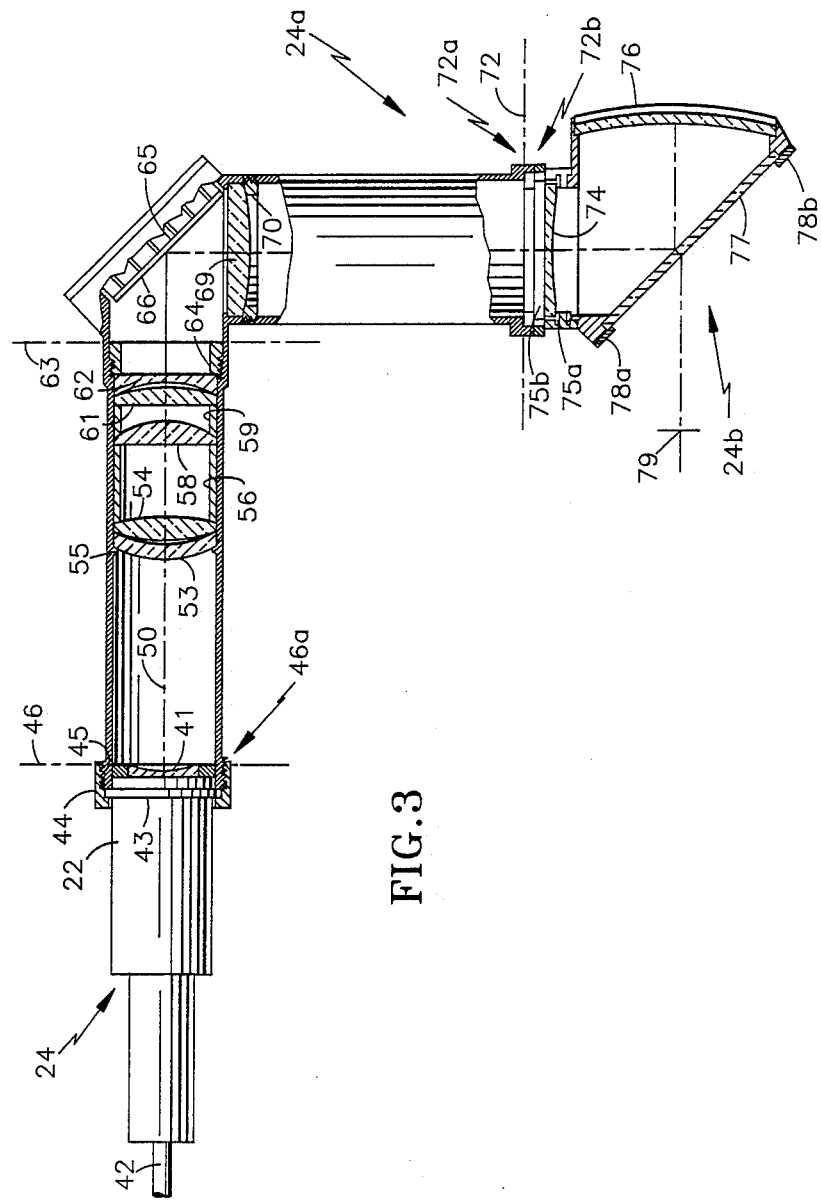
FIG. 3 is a cross sectional view of a portion of the HMD apparatus.

FIG. 3 is a cross-sectional view of either one of the optical component arrangements 24,25. The CRT 22 presents a visual image of flight information on a plano concave fiber optic faceplate 41 that is a part of the CRT. The CRT is typically a Model H-1380, one inch diameter, miniature CRT provided by Hughes Aircraft Company, Industrial Products Division, Carlsbad, Calif. The CRT drive electronics (not shown) are well known and are located in the aircraft cockpit. The drive electronics can operate the CRT in either the stroke (high brightness) mode or raster mode. The CRT image information is presented to the drive electronics by the on-board flight computer. The drive electronics connect to the CRT by a shielded electrical cable 42. The CRT 22 attaches to the relay optic portion 24a by means of a flange 43 secured with adhesive to the CRT and a nut assembly 44 which mates with threads 45 on the relay optic portion. This attachment point is located at an entrance aperture 46a of the relay optic portion, as illustrated by the split line 46.

Proceeding along an optical axis 50, a pair of glass optical lenses 53,54 are positioned after the CRT faceplate 41. The first lens 53 is positioned with a machined seat 55. The second lens 54 rests against the first lens. A first tubular spacer 56 follows the second lens, followed by a third lens 58, a second tubular spacer 59, and a second pair of lenses 61,62. The two lenses comprising each of the first and second lens pairs are normally positioned next to each other and are made of different types of glass or plastic material so as to reduce chromatic abberrations.

A split line 63 designates a physical break in the relay optic portion; the segment to the left of the split line 63 is either press-fitted or secured with adhesive into the segment to the right of the split line. A lens retaining nut 64 is positioned to hold the lenses 53,54,58,61,62 and spacers 56,59 in place.

Attached to a back surface 65 is a fold mirror 66 which is used to direct (fold) the optical axis 50 downward in the relay optic portion. The mirror 66 is attached using conventional optical component mounting techniques known in the art so as to provide a low stress mount. A sixth lens 69 is positioned by a second lens retaining nut 70. The relay optic portion then physically terminates at a split line 72. The split line can also considered illustrative of the location of an intermediate image focal plane 72a of the relay optic portion, and of an input aperture 72b of the eyepiece.

Located underneath the split line 72 is a first eyepiece lens 74 positioned against a machined seat 75a with a retaining nut 75b. Also contained in the eyepiece is a combiner 76 and a beamsplitter 77. The beamsplitter 77 is held in place with clips 78a, 78b. The optical axis is illustrated as terminating at a focal point 79 at the observer's eye (i.e., with an observer wearing the HMD). It is to be understood that the optical components comprising the nighttime eyepiece 25c are positioned inside the eyepiece with similar types of machined seats and retainer nuts.

Figure 4:
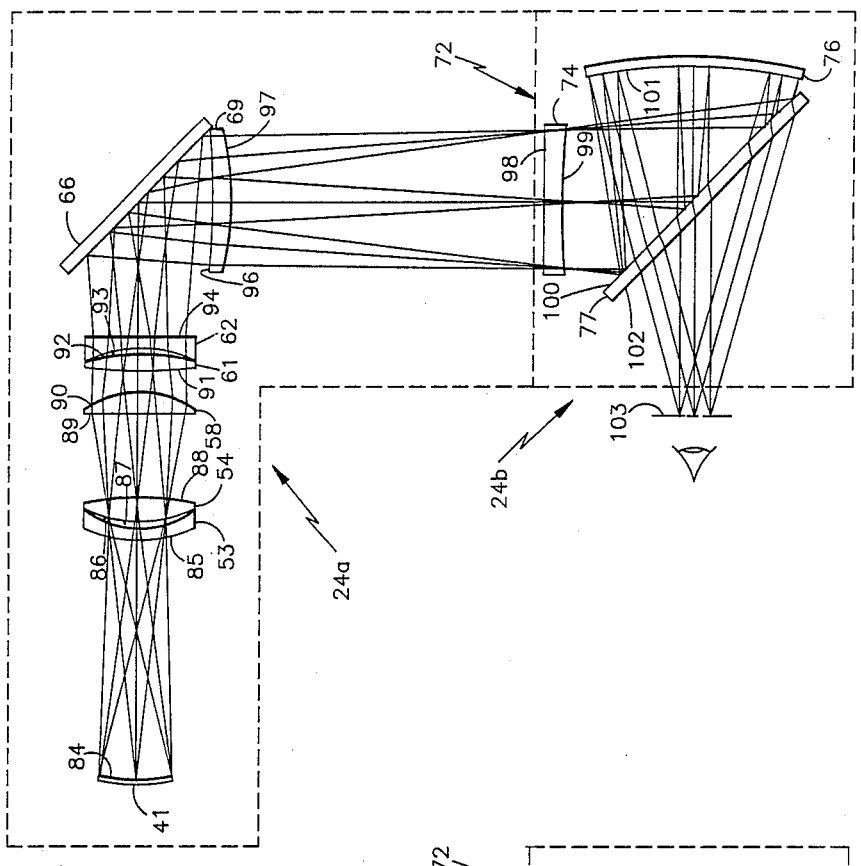
FIG. 4 illustrates an optical ray trace of HMD optical components.

FIG. 4 illustrates an optical ray trace of a preferred embodiment of the projection optical components. The relay optic portion components are above the split line 72, while the components of the daytime eyepiece 24b are below the split line. Also, surfaces and inter-component spacings of each component are enumerated in FIG. 4.

TABLE I

| Surface No. | Radius (mm) | Curve Type | Thick/Dist (mm) | Mat'l |
| --- | --- | --- | --- | --- |
| 84 | 40.000000 | CV | 61.863200 | AIR |
| 85 | 35.488000 | CX | 3.000000 | F4 |
| 86 | 21.770000 | CV | 1.792300 | AIR |
| 87 | 33.991000 | CX | 6.000000 | SIO2 |
| 88 | 85.875000 | CX | 21.905600 | AIR |
| 89 | 201.985000 | CV | 5.500000 | SIO2 |
| 90 | 24.617000 | CX | 5.209200 | AIR |
| 91 | 175.000000 | CX | 4.500000 | SIO2 |
| 92 | 54.941000 | CX | 1.433000 | AIR |
| 93 | 30.044000 | CV | 3.000000 | F4 |
| 94 | 384.855000 | CX | 34.294000 | AIR |
| 95 | — | — | 19.000000 | AIR |
| 96 | 221.803000 | CV | 5.000000 | SIO2 |
| 97 | 74.673000 | CX | 81.356900 | AIR |
| 98 | 2000.000000 | CX | 5.000000 | ACRYL |
| 99 | 221.803000 | CV | 33.643100 | AIR |
| 100 | — | — | 34.801353 | AIR |
| 101 | 128.165000 | CV | 35.941353 | AIR |

TABLE I-continued

| Surface No. | Radius (mm) | Curve Type | Thick/Dist (mm) | Mat'l |
| --- | --- | --- | --- | --- |
| 100 | — | — | 3.000000 | ACRYL |
| 102 | — | — | 51.420000 | AIR |
| 103 | — | — | — | — |

Table I lists the prescription data for the optical components. Listed in order from left to right are (1) the surface number, (2) the radius of curvature in mm, (3) the type of curvature (CV=concave; CX=convex), (4) the distance to the next surface or thickness in mm, and (5) the type of material between the surface and the next surface. The type and radius of curvatures of the optical components are chosen in part to control astigmatism and spherical aberrations.

Thus, referring to FIG. 4 and Table I, the image produced by the CRT is presented on an outer surface 84 of the plano concave (CV) fiber optic faceplate 41 having a radius of curvature of 40 mm. The faceplate is located approximately at an entrance pupil 46a of the relay optic portion. The optical rays then travel through air a distance of 61.8632 mm to a first surface 85 of the first glass lens 53. All distances listed in Table I are measured from the centers of each component. The first surface 85 of the first lens has a convex shape and a radius of curvature of 35.488 mm. Also, the lens is 3.0 mm thick and is made of F4 glass. The physical characteristics and spatial disposition of the remaining optical components are determined from FIG. 4 and Table I in a similar manner.

It is to be noted that surface 95 is that of the fold mirror, whose surface comprises an aluminized reflective coating. Also, surface 100 is listed twice in Table I in accord with the path taken by the light which is first reflected from partially reflective surface 100 to surface 101, then reflected from partially reflective surface 101 back toward the eye, passing through the beamsplitter defined by surfaces 100 and 102. The first listing indicates a 34.801353 mm ray travel distance to surface 101, whereas the second listing indicates a beamsplitter thickness of 3 mm. Also, surface 103 indicates the exit pupil of the optical rays. The exit pupil is approximately 8 mm in diameter.

The relay optics are designed to produce a focused CRT image at the point in the optical path in proximity to the intermediate image focal plane 72a. The focused image has a magnification range of 0.5-4 of the image at the CRT faceplate 41. The focused image at the focal plane is at a distance of 100-400 mm (i.e., the focal length of the relay optics) along the optical path 50 from the faceplate.

The daytime eyepiece essentially creates a virtual image, in the observer's forward field of view, of the focused image at the focal plane. This virtual image is focused at a distance from the observer's eye of from one meter to infinity, which results in the image appearing in focus to the eye of the observer. Thus, the observer does not have to refocus his eyes to view the image generated by the CRT that is superimposed on the observer's view of the external terrain. The virtual image occupies a portion of the observer's visual field having a minimum subtense at the eye of ten (10) degrees. The focal length of the eyepiece is approximately 100 mm, resulting in an overall optical path length from the faceplate to the eye of 200-400 mm.

The CRT faceplate is shown with 19 mm diameter which is the active image area of the miniature CRT. The lens diameters are chosen to contain the rays with margin to permit retention in the relay optic portions. The lenses comprising the relay optic portion are all glass; either F4 or fused silica (SIO2). The eyepiece components are all acrylic plastic. Plastic elements were chosen for weight and safety reasons. However, it is to be understood that the eyepiece lenses can be glass if so desired.

All components other than the folding mirror 66 have a known antireflective coating. In addition, the coatings on the surface 101 of the combiner 76 and the surface 100 of the beamsplitter 77 are adjusted for a reflectivity of 20%-60% (40% preferred) for visible light in the wavelength range of 400-700 nanometers. The resulting partial transmissivity of the beamsplitter and combiner allow the observer to view external scenes disposed beyond the daytime eyepiece. The day eyepiece can be termed catadioptric due to the use of partially transmissive/partially reflective optical components. Each optical element in FIG. 4 can be built from the prescription data of Table I using known techniques.

Figure 5:
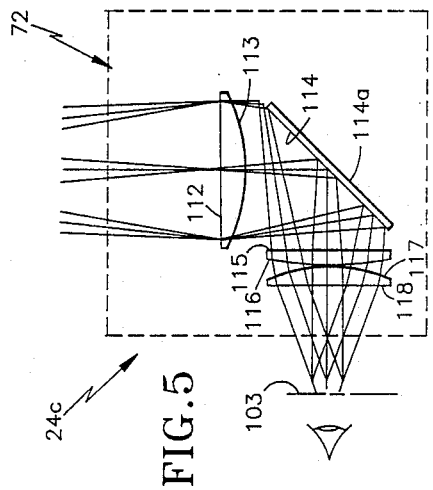
FIG. 5 illustrates a second optical ray trace of HMD optical components.

FIG. 5 illustrates an optical ray trace of the optical components comprising the nighttime eyepiece 24c. Table II lists the corresponding prescription data. Since the housing portion components are the same as those illustrated in FIG. 4, the entries in Table II for surfaces 84-96 are similar to those in Table I. Note that surface 114 of component 114a is an aluminized reflective surface which totally reflects the optical rays and blocks transmission of optical rays of the external scene disposed beyond the night eyepiece. Thus, component 114a is essentially opaque. Also, the image projected into the observer's forward field of view occupies an angle in the observer's forward field of view having a minimum subtense of twenty (20) degrees.

TABLE II

| Surface No. | Radius (mm) | Curve Type | Thick/Dist (mm) | Mat'l |
|---|---|---|---|---|
| 84 | 40.000000 | CV | 61.863200 | AIR |
| 85 | 35.488000 | CX | 3.000000 | F4 |
| 86 | 21.770000 | CV | 1.792300 | AIR |
| 87 | 33.991000 | CX | 6.000000 | SIO2 |
| 88 | 85.875000 | CX | 21.905600 | AIR |
| 89 | 201.985000 | CV | 5.500000 | SIO2 |
| 90 | 24.617000 | CX | 5.209200 | AIR |
| 91 | 175.000000 | CX | 4.500000 | SIO2 |
| 92 | 54.941000 | CX | 1.433000 | AIR |
| 93 | 30.044000 | CV | 3.000000 | F4 |
| 94 | 384.855000 | CX | 34.294000 | AIR |
| 95 | — | — | 19.000000 | AIR |
| 96 | 221.803000 | CV | 5.000000 | SIO2 |
| 97 | 74.673000 | CX | 93.000000 | AIR |
| 112 | 1863.457201 | CX | 7.000000 | ACRYL |
| 113 | 39.515000 | CX | 21.000000 | AIR |
| 114 | — | — | 20.500000 | AIR |
| 115 | — | — | 4.000000 | ACRYL |
| 116 | 83.478000 | CX | 0.500000 | AIR |
| 117 | 39.515000 | CX | 4.500000 | ACRYL |
| 118 | — | — | 25.000000 | AIR |
| 103 | — | — | — | — |

Figure 7:
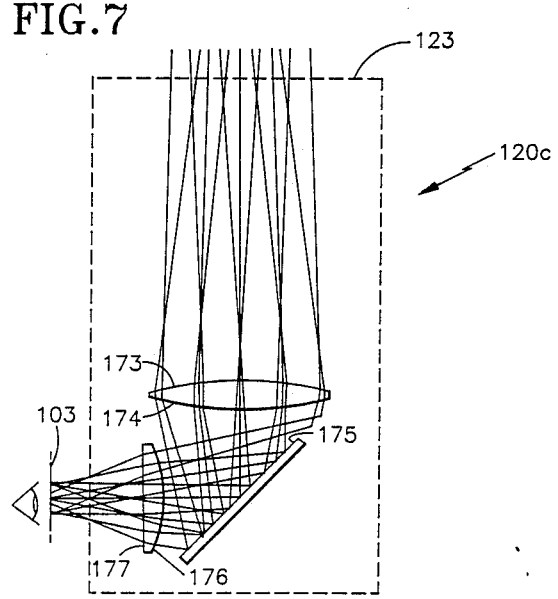
FIG. 7 illustrates a second optical ray trace of an alternative embodiment of HMD optical components.
Figure 6:
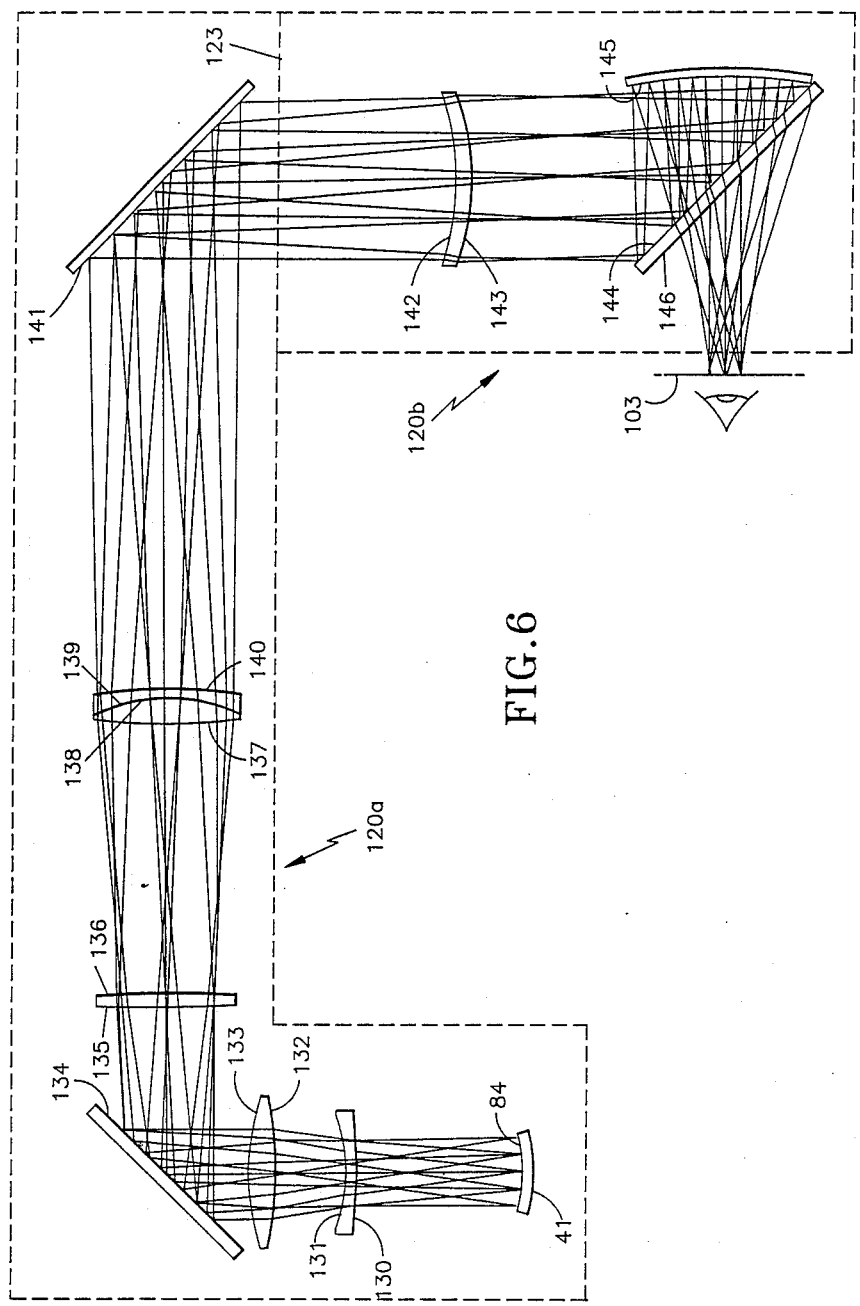
FIG. 6 illustrates an optical ray trace of an alternative embodiment of HMD optical components.

FIG. 6 illustrates an optical ray trace of an alternative embodiment of a housing portion 120a and a daytime eyepiece portion 120b of optical components. The housing and eyepiece portions are separated at a split line 123. Table III list the corresponding prescription data. FIG. 7 illustrates the alternative embodiment nighttime eyepiece 120c. Table IV list the corresponding prescription data. The alternative embodiments are comprised entirely of conventional plastic optical elements. It should be noted that the alternative embodiments illustrated have a longer optical path length than the preferred embodiments of FIGS. 4,5. This requires the CRTs 22,23 and a portion of the relay optic components to be mounted on the back side of the helmet 21 for best fit to the outer surface of the helmet.

TABLE III

| Surface No. | Radius (mm) | Curve Type | Thick/Dist (mm) | Mat'l |
|---|---|---|---|---|
| 84 | 40.000000 | CV | 42.360000 | AIR |
| 130 | 149.880000 | CX | 3.000000 | POLYC |
| 131 | 53.660000 | CV | 18.418400 | AIR |
| 132 | 110.449000 | CX | 7.000000 | ACRYL |
| 133 | 57.279000 | CX | 21.000000 | AIR |
| 134 | — | — | 43.000000 | AIR |
| 135 | 316.793000 | CX | 4.000000 | ACRYL |
| 136 | 316.793000 | CX | 69.000000 | AIR |
| 137 | 163.725000 | CX | 7.000000 | ACRYL |
| 138 | 42.692000 | CX | 0.000000 | AIR |
| 139 | 42.692000 | CV | 2.000000 | POLYC |
| 140 | 135.158000 | CX | 130.000000 | AIR |
| 141 | — | — | 76.000000 | AIR |
| 142 | 65.596000 | CV | 4.200000 | ACRYL |
| 143 | 55.139000 | CX | 64.000000 | AIR |
| 144 | — | — | 25.300000 | AIR |
| 145 | 135.158000 | CV | 26.500000 | AIR |
| 144 | — | — | 3.000000 | ACRYL |
| 146 | — | — | 47.000000 | AIR |
| 103 | — | — | — | — |

TABLE IV

| Surface No. | Radius (mm) | Curve Type | Thick/Dist (mm) | Mat'l |
|---|---|---|---|---|
| 84 | 40.000000 | CV | 42.360000 | AIR |
| 130 | 149.880000 | CX | 3.000000 | POLYC |
| 131 | 53.660000 | CV | 18.418400 | AIR |
| 132 | 110.449000 | CX | 7.000000 | ACRYL |
| 133 | 57.279000 | CX | 21.000000 | AIR |
| 134 | — | — | 43.000000 | AIR |
| 135 | 316.793000 | CX | 4.000000 | ACRYL |
| 136 | 316.793000 | CX | 69.000000 | AIR |
| 137 | 163.725000 | CX | 7.000000 | ACRYL |
| 138 | 42.692000 | CX | 0.000000 | AIR |
| 139 | 42.692000 | CV | 2.000000 | POLYC |
| 140 | 135.158000 | CX | 130.000000 | AIR |
| 141 | — | — | 114.000000 | AIR |
| 173 | 84.312000 | CX | 8.000000 | POLYC |
| 174 | 84.312000 | CX | 23.000000 | AIR |
| 175 | — | — | 21.000000 | AIR |
| 176 | 34.836000 | CX | 5.000000 | ACRYL |
| 177 | — | — | 24.000000 | AIR |
| 103 | — | — | — | — |

The preferred embodiment of the daytime optical components provide for data display in a 30-35 degree monocular field of view with 36% see-through luminance transmission, and approximately 6% luminance transfer from the CRT (60% beamsplitter transmission, 60% combiner transmission). The nighttime optical components provide for approximately 40 degree monocular field of view with no combiner see-through. The HMD is designed for binocular viewing using two eyepieces with 100% overlap of the left and right visual fields. Also, the optics are designed to accomodate a CRT image source having an active image diameter in the range of 16-25 mm, with the projection optical lenses having an effective focal length in the range of 15-55 mm.

The discussion thus far is directed to an HMD having interchangeable eyepieces, as disclosed in the aforementioned copending U.S. patent application to Fournier et al. It is to be understood that the present invention can be adapted to utilize concepts disclosed therein to achieve the objectives of the present invention without departing from the scope thereof.

Figure 8:
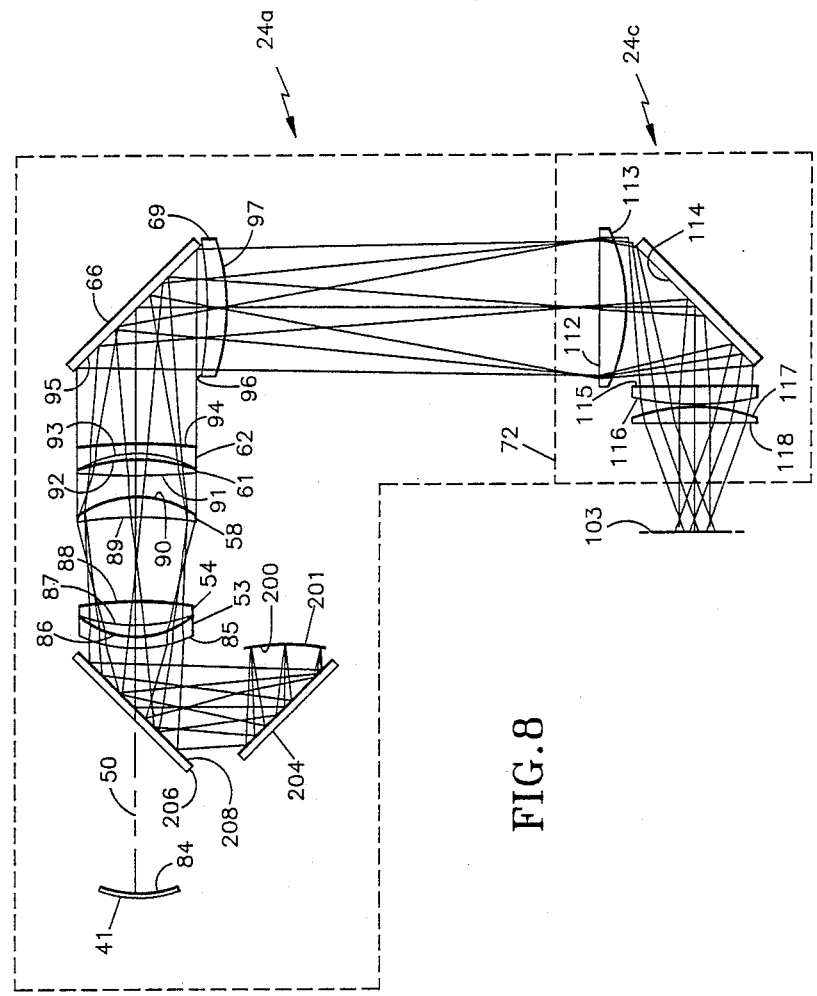
FIG. 8 illustrates an optical ray trace of a preferred embodiment of optical components in accordance with the present invention.

FIG. 8 illustrates an optical ray trace of a preferred embodiment of the present invention. Illustrated are the optical components comprising the relay optic portion 24a of FIG. 4 together with the nighttime eyepiece 24c of FIG. 5, and including the optical components in accordance with the present invention. A visual image comprised of optical signals is provided on an object surface 200 of an image source 201, such as a known type image intensifier device. The optical signals emanating from the object surface proceed to encounter a reflecting optical component (mirror) 204 which is disposed to present the optical signals to a beamsplitter 206. The beamsplitter 206 is disposed in the optical path 50 both to reflect the optical signals emanating from the image intensifier object surface 200, and to transmit the optical signals from the faceplate 41. The image intensifier optical signals are reflected by surface 208 of the beamsplitter, the surface being coated with a suitable known type optical coating so as to achieve a reflectivity of from 80–95%. This high reflectivity is desired because the luminance of the image on the image intensifier object surface is typically much lower than the luminance of the image on the CRT faceplate (1% or less). Consequently, the transmissivity of the beamsplitter surface 208 is approximately 5–20% (i.e., 20% of the optical signals from the faceplate 41 are transmitted through the beamsplitter).

The disposition of the beamsplitter in the optical path is such that the image intensifier optical signals are directed along the optical path 50 towards the surface 85 of the first lens 53 in the same direction as the optical signals from the faceplate. The result is that the image from the CRT faceplate is superimposed on the image from the image intensifer. (Note the FIG. 8 illustrates the path of the optical rays from the image intensifer object surface through the eyepiece only; not shown are the optical rays from the CRT faceplate). The superimposed image is then transferred by the relay optic portion and the eyepiece into the observer's forward field of view.

However, in order to achieve proper superposition of the two images, the optical path length from the image intensifier object surface 200 to the surface 85 of the first lens 53 must equal the optical path length from the faceplate 41 to the surface 85 of the first lens 53. This distance is referred to as the back focus distance, which, from Table I, equals 61.863200 mm for the preferred embodiment of FIG. 8. Also, because the beamsplitter 206 is disposed in the optical path 50 at a point where the optical signals are not collimated, the beamsplitter is required to be thin (less than 1 mm thick) so as to reduce astigmatism. If a thicker beamsplitter were employed, additional lenses would be required to correct the aberrations. Such additional lenses add an undersirable weight to the overall HMD. The thin beamsplitter can either be made of quartz or be that of a pellicle type consisting of a coated membrane supported on a frame. The pellicle beamsplitter effectively has zero optical thickness, and, thus, does not distort transmitted images.

Figure 9:
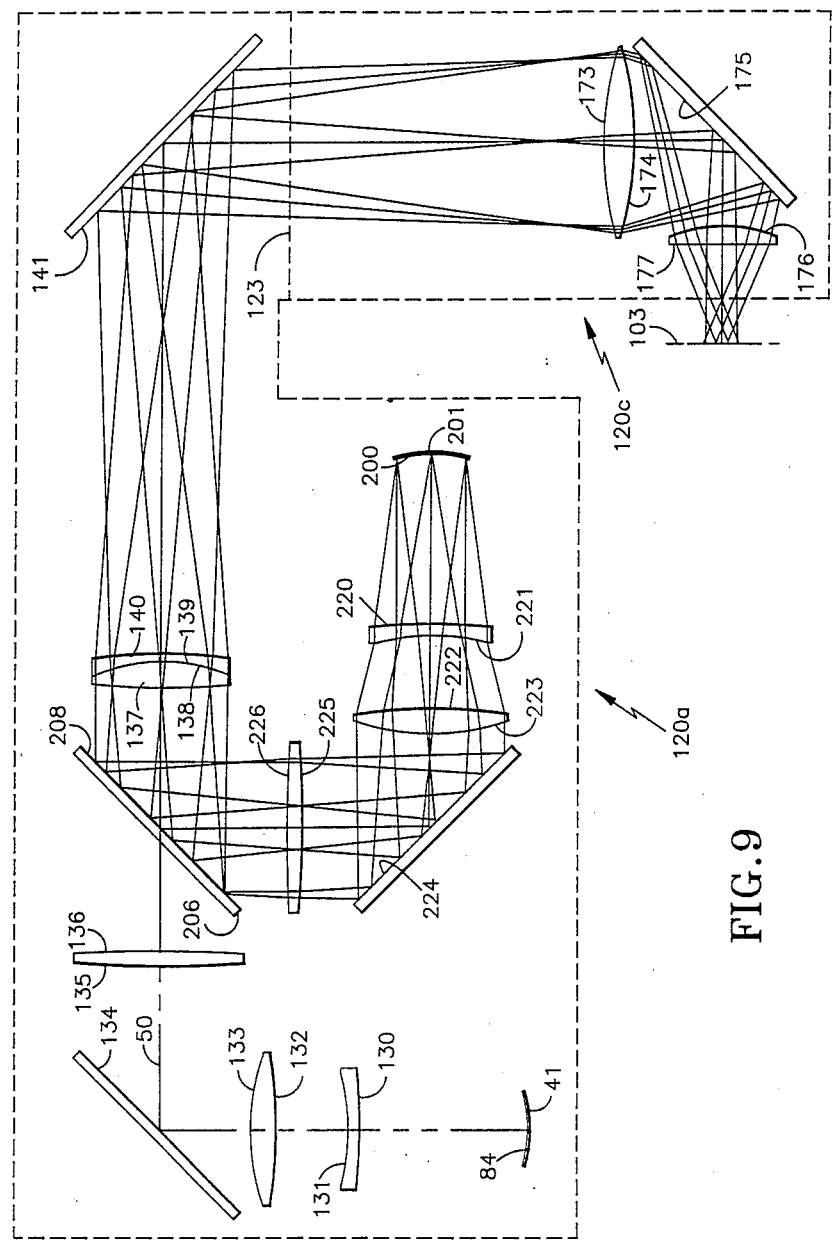
FIG. 9 illustrates an optical ray trace of an alternative embodiment of optical components in accordance with the present invention.

FIG. 9 illustrates an alternative embodiment of the present invention comprising the all plastic optical component design of the relay optic portion of FIG. 6 together with the nighttime eyepiece of FIG. 7, and including the optical components in accordance with the present invention. Note that the all plastic alternative embodiment necessitates additional lenses in the optical path from the image intensifier object surface 200 to the beamsplitter 206. Table V lists the corresponding prescription data for the optical component surfaces from the image intensifier object surface 200 through surface 137. The remaining surfaces in the optical path are listed in Table IV. As with the preferred embodiment of FIG. 8, the optical path distance from the image intensifier object surface 200 to the lens surface 137 equals the optical path distance from the CRT faceplate 41 to the lens surface 137.

TABLE V

| Surface No. | Radius (mm) | Curve Type | Thick/Dist (mm) | Mat'l |
|---|---|---|---|---|
| 200 | 40.000000 | CV | 43.208237 | AIR |
| 220 | 149.880000 | CX | 3.000000 | POLYC |
| 221 | 53.660000 | CV | 18.472773 | AIR |
| 222 | 110.449000 | CX | 7.000000 | ACRYL |
| 223 | 57.279000 | CX | 24.000000 | AIR |
| 224 | — | — | 33.000000 | AIR |
| 225 | 316.793000 | CX | 4.000000 | ACRYL |
| 226 | 316.793000 | CX | 33.000000 | AIR |
| 208 | — | — | 36.000000 | AIR |

Figure 10:
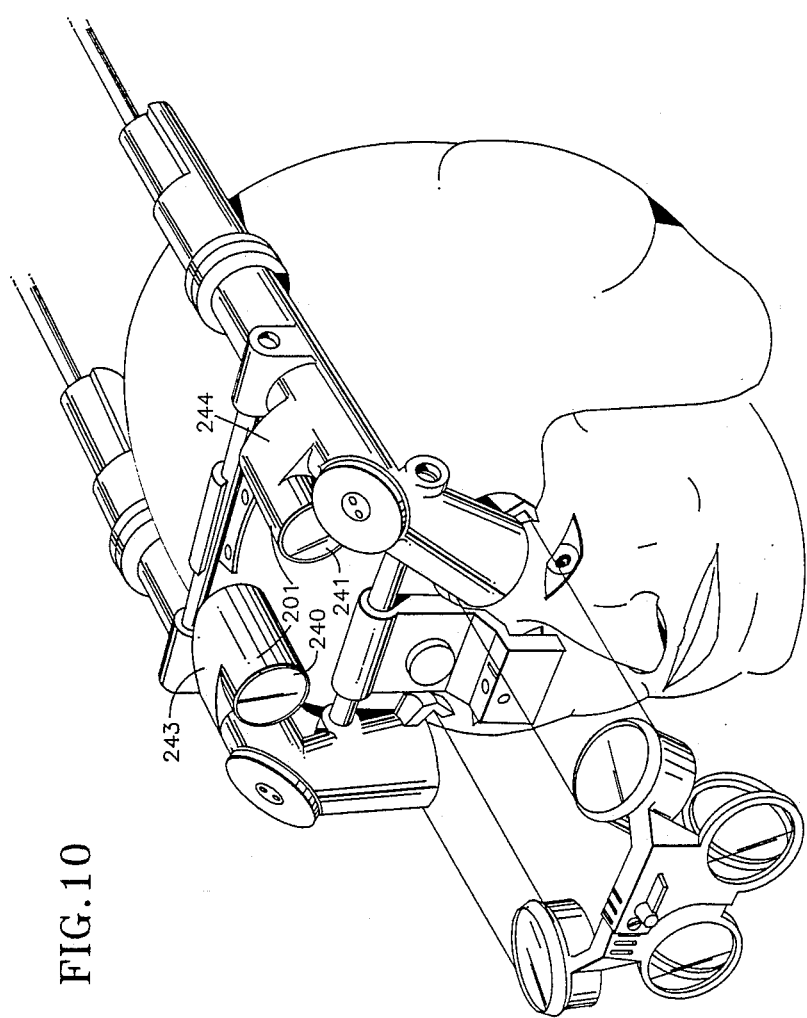
FIG. 10 illustrates a perspective view of HMD apparatus in accordance with the present invention.

FIG. 10 illustrates a perspective view of a HMD with a pair of identical image intensifier devices 201 mounted on the helmet 21 in accordance with the present invention. FIG. 10 is essentially a replicate of FIG. 2 with the addition of the image intensifier devices mounted on the helmet. Each image intensifier has a sensing surface 240,241 on the front of the device that senses the external scene. Each image intensifier processes the sensed scene and presents- an image of it on the respective object surface 200 (not visible) of each device. The image from the each image intensifier device is superimposed together with the image from the respective CRT 22,23 by the the corresponding mirror 204 and beamsplitter 206 (not visible). That is, each image intensifier has an identical mirror 204 and identical beamsplitter 206 disposed after its object surface for presenting the image into the respective relay optic portion 24a,24b. Each mirror/beamsplitter pair is enclosed in a separate aluminum housing portion 243,244 in a similar fashion as that of the optical components illustrated in FIG. 3 (i.e., with suitable machined seats).

In operation, the pilot dons the HMD having the image intensifier devices incorporated directly on the helmet in accordance with the present invention. The pilot also attaches the night eyepiece to the HMD. Then, during flight, the exterior scene is sensed by the image intensifier devices and the image provided by these devices is superimposed with an image of symbol pilotage data provided by each CRT. The resulting superimposed image is projected into the pilot's forward field of view by the relay optic portion and the nighttime eyepiece. There is no inherent time lag in this type of night vision HMD from the time the pilot moves his head angularly to the time the proper image of the external scene is presented to the pilot's forward field of view. The present invention also lacks the complexity and cost of prior art night vision HMDs.

A binocular HMD has been illustrated herein incorporating two identical image intensifying devices together with relay optic portions and eyepieces. However, it is to be understood that a monocular HMD can be implemented employing a single image intensifying device together with a single relay optic portion and eyepiece without departing from the scope of the present invention.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. Helmet mounted apparatus for use in a display system, comprising:
    a helmet, adapted to be worn by an observer, having an outer surface with an opening provided in proximity to the eyes of the observer;
    a first image source disposed on said helmet to provide an image;
    relay optic means, comprising a plurality of optical components and being disposed on said helmet outer surface, for receiving the image from said first image source at an entrance pupil thereof and for guiding the image along an optical path to an intermediate image focal plane located in proximity to said outer surface opening, said plurality of optical components including a first lens disposed along the optical path at a predetermined distance from said first image source, said relay optic means being adapted to engage an eyepiece;
    a second image source disposed on said helmet to provide an image;
    an optical beamsplitter component disposed in the optical path between said first image source and said first lens both to reflect the image provided by said second image source in a direction along the optical path toward said first lens and to transmit the image from said first image source along the optical path toward said first lens, an optical path distance from said second image source to said first lens being equal to the predetermined optical path distance from said first image source to said first lens, said beamsplitter component being so spatially positioned as to effectively superimpose the image from said second image source upon the image from said first image source, the image in proximity to said intermediate image focal plane being a focused form of the superimposed image at said first lens; and
    eyepiece means for receiving the superimposed image from said intermediate image focal plane at an input aperture thereof and for presenting, in the observer's forward field of view, the superimposed image as focused in the optical path in proximity to said intermediate image focal plane, said eyepiece means being adapted to releasably engage said relay optic means, said eyepiece means, when engaged, receiving the superimposed image from said intermediate image focal plane and presenting the image in the observer's forward field of view.

2. The helmet mounted apparatus of claim 1, wherein said first image source is a cathode ray tube.

3. The helmet mounted apparatus of claim 1, wherein said second image source is an image intensifying device.

4. The helmet mounted apparatus of claim 1, further comprising one or more optical components disposed to guide the image from said second image source to said beamsplitter component.

5. The helmet mounted apparatus of claim 4, wherein said one or more components includes a mirror.

6. The helmet mounted apparatus of claim 1, wherein a surface of said beamsplitter component nearest to said first lens is coated with an optical coating having a reflectivity in the range of from eighty to ninety five percent.

7. The helmet mounted apparatus of claim 1, wherein said beamsplitter component comprises optical quartz material having a thickness of approximately one millimeter.

8. The helmet mounted apparatus of claim 1, wherein said beamsplitter component comprises a pellicle type beamsplitter component.

9. The helmet mounted apparatus of claim 1, wherein said eyepiece means includes an optical reflecting component disposed in the observer's forward field of view to reflect, into the observer's forward field of view, the superimposed image as focused at said input aperture, said reflecting component being opaque to the exterior scene image disposed in the observer's forward field of view beyond said reflecting component.

10. The helmet mounted apparatus of claim 1, wherein said optical components comprising said relay optic means includes a plurality of lenses of different material composition disposed in proximity to one another, whereby each said lens pair reduces chromatic abberrations of the optical signals that are guided through said lenses.

11. The helmet mounted apparatus of claim 1, wherein said optical components comprising said relay optic means includes a mirror disposed to reflect the superimposed image along the optical path in the direction of said intermediate image focal plane.

12. The helmet mounted apparatus of claim 1, wherein the length of the optical path from said entrance pupil to said intermediste image focal plane is in the range of 100–400 millimeters.

13. Head mounted apparatus for use in a display system, comprising:
    helmet means, adapted to permit attachment of optical components, having an opening in proximity to the eyes of the observer;
    first image source means, being self luminous and adapted to be mounted to said helmet means, for providing an image, the average brightness of said first image source means being variable over a substantial range of luminance values;
    second image source means, being self luminous and adapted to be mounted to said helmet means, for providing an image, the average brightness of said second image source means being of relatively low luminance; and
    optic means, adapted to be mounted to said helmet means, for presenting a virtual image of said first and second image source means at a focus of from one meter to infinity in the observer's visual field, said optic means including first and second coupling optic means, common relay optic means and two separate interchangeable optical eyepiece means, each of said eyepiece means comprising an arrangement of optical components, said common relay optic means comprising an arrangement of optical components common for usage with each of said eyepiece means, said common relay optic means being adapted to releasably engage each of said eyepiece means, only one of said eyepiece means being engaged to said relay optic means at any time, said first and second coupling optics means comprising means for directing light rays from a corresponding one of said image source means into said common relay optic means.

14. The apparatus of claim 13, wherein said common relay optic means optical components includes a first lens disposed in an optical path, the optical path length from said first image source means to said first lens being equal to the optical path length from said second image source means to said first lens, whereby the equal optical path lengths result in both said first and second image source means being optically equivalent.

15. The apparatus of claim 14, wherein said first image source means is disposed along the optical path of said common relay optics means, said second coupling optic means including optical beamsplitter means disposed along the optical path between said first image source means and said first lens of said common relay optic means, said beamsplitter means comprising means for simultaneously reflecting the light rays from said second image source means into the optical path of said common relay optic means and transmitting the light rays from said first image source means along the optical path of said common relay optic means.

16. The apparatus of claim 15, wherein said first image source means comprises a miniature cathode ray tube having an active image diameter in the range of 16–25 millimeters.

17. The apparatus of claim 16, wherein said second image source means comprises an image intensifier device having a input sensing surface for sensing external scenes of low luminance disposed beyond said sensing surface and having an output image surface with an active image diameter in the range of 16–25 millimeters, whereby said image intensifer presents a low luminance image of said sensed exterior scene on said output surface.

18. The apparatus of claim 17, wherein said second coupling optic means include optical reflecting means disposed in an optical path following said second image source means, said reflecting means comprising means for folding said second coupling optic means thereby positioning the field of view of said image intensifier device in the observer's visual field, said reflecting means further comprising means for reflecting the light rays from said second image source means along the optical path of said second optic means toward said optical beamsplitter means.

19. The apparatus of claim 18, wherein said optical reflecting means includes a mirror.

20. The apparatus of claim 18, wherein said optical reflecting means includes a prism.

21. The apparatus of claim 17, wherein said common relay optic means comprises means for forming an intermediate real image of said first image source means superimposed with said second image source means at a distance of up to 400 millimeters from said first image source means, said intermediate real image having a magnification of from 0.5 to 4.0 times that of both said image provided by said first image source means and said image provided by said second image source means.

22. The apparatus of claim 21, wherein each said eyepiece means comprises means for presenting a virtual image of said intermediate real image at a focus of from one meter to infinity in the observer's forward visual field.

23. The apparatus of claim 22, wherein a first said arrangement of optical components comprising a corresponding one of said eyepiece means is catadioptric, said catadioptric eyepiece comprising partially reflective, partially transmissive optical components for superimposing said virtual image in the observer's view of the external scene, said virtual image occupying a portion of the observer's visual field having a minimum subtense of 10 degrees at the observer's eye, whereby said catadioptric eyepiece is optimized for viewing said first image source means image, said first image source means image being of substantially greater brightness than said second image source means image.

24. The apparatus of claim 23, wherein said catadioptric eyepiece comprises a partially transmissive, partially reflective plane beamsplitter disposed in front of the observer's eye, and a second partially transmissive, partially reflective curved combiner optical component disposed in front of said plane beamsplitter along the observer's line of sight.

25. The apparatus of claim 24, wherein a surface of said combiner nearest to the observer's eye is coated with a partially reflective, partially transmissive optical coating having reflectivity in the range of 20–60 percent for visible light in the wavelength range of 400–700 nanometers.

26. The apparatus of claim 25, wherein a surface of said plane beamsplitter farthest from the observer's eye is coated with a partially reflective, partially transmissive optical coating having reflectivity in the range of 20–60 percent for visible light in the wavelength range of 400–700 nanometers.

27. The apparatus of claim 26, wherein a secondary surface or each of said plane beamsplitter and said combiner is coated with an antireflective optical coating for visible light in the wavelength range of 400–700 nanometers, whereby said antireflective coating reduces spurious reflections of visible light in the wavelength range of 400–700 nanometers.

28. The apparatus of claim 27, wherein said combiner comprises a lightweight glass material such as fused silica.

29. The apparatus of claim 27, wherein said plane beamsplitter comprises a lightweight glass material such as fused silica.

30. The apparatus of claim 27, wherein said combiner comprises optical plastic material such as polycarbonate or acrylic.

31. The apparatus of claim 27, wherein said plane beamsplitter comprises optical plastic material such as polycarbonate or acrylic.

32. The apparatus of claim 23, wherein the effective focal length of said first coupling optic means together with said common relay optic means optical components and said catadioptric eyepiece optical components is in the range of 15–55 millimeters.

33. The apparatus of claim 23, wherein said catadioptric eyepiece optical components are mounted in a goggle assembly, said catadioptric eyepiece goggle assembly disposed to releasably engage said common relay optic means.

34. The apparatus of claim 33, wherein said first image source means includes an output image surface positioned for direct optical coupling of said first image source means image to said common relay optic means, said common relay optic means optical components including a plurality of lenses and a plane folding mirror, said refractive eyepiece optical components including at least one eyepiece lens, said refractive eyepiece optical components together with said first and second image source means output image surfaces and said common relay optic means optical components having the following optical prescription characteristics and inter-component spacing:

| Component Type | Surface No. | Radius (mm) | Curve Type | Thick/Dist (mm) | Mat'l |
|---|---|---|---|---|---|
| Img Src 2 | 200 | 40.000000 | CV | 61.863200 | AIR |
| Lens | 85 | 35.488000 | CX | 3.000000 | F4 |
| Img Src 1 | 84 | 40.000000 | CV | 61.863200 | AIR |
| Lens | 85 | 35.488000 | CX | 3.000000 | F4 |
| " | 86 | 21.770000 | CV | 1.792300 | AIR |
| Lens | 87 | 33.991000 | CX | 6.000000 | SIO2 |
| " | 88 | 85.875000 | CX | 21.905600 | AIR |
| Lens | 89 | 201.985000 | CV | 5.500000 | SIO2 |
| " | 90 | 24.617000 | CX | 5.209200 | AIR |
| Lens | 91 | 175.000000 | CX | 4.500000 | SIO2 |
| " | 92 | 54.941000 | CX | 1.433000 | AIR |
| Lens | 93 | 30.044000 | CV | 3.000000 | F4 |
| " | 94 | 384.855000 | CX | 34.294000 | AIR |
| Mirror | 95 | — | — | 19.000000 | AIR |
| Lens | 96 | 221.803000 | CV | 5.000000 | SIO2 |
| " | 97 | 74.673000 | CX | 93.000000 | AIR |
| Lens | 112 | 1863.457201 | CX | 7.000000 | ACRYL |
| " | 113 | 39.515000 | CX | 21.000000 | AIR |
| Mirror | 114 | — | — | 20.500000 | AIR |
| Lens | 115 | — | — | 4.000000 | ACRYL |
| " | 116 | 83.478000 | CX | 0.500000 | AIR |
| Lens | 117 | 39.515000 | CX | 4.500000 | ACRYL |
| " | 118 | — | — | 25.000000 | AIR |
| | 103 | — | — | — | — |

35. The apparatus of claim 33, wherein said first image source means includes an output image surface positioned for optical coupling of said first image source means image to said common relay optic means by said first coupling optic means, said common relay optic means optical components including a plurality of lenses and a plane folding mirror, said refractive eyepiece optical components including at least one eyepiece lens, said second coupling optic means comprising optical components including a plurality of lenses, a plane mirror and an optical beamsplitter, said refractive eyepiece optical components together with said first and second image source means output image surfaces, said common relay optic means optical components and said first and second coupling optic means optical components having the following optical prescription characteristics and inter-component spacing:

| Component Type | Surface No. | Radius (mm) | Curve Type | Thick/Dist (mm) | Mat'l |
|---|---|---|---|---|---|
| Img Src 2 | 200 | 40.000000 | CV | 43.208237 | AIR |
| Lens | 220 | 149.880000 | CX | 3.000000 | POLYC |
| " | 221 | 53.660000 | CV | 18.472773 | AIR |
| Lens | 222 | 110.449000 | CX | 7.000000 | ACRYL |
| " | 223 | 57.279000 | CX | 24.000000 | AIR |
| Mirror | 224 | — | — | 33.000000 | AIR |
| Lens | 225 | 316.793000 | CX | 4.000000 | ACRYL |
| " | 226 | 316.793000 | CX | 33.000000 | AIR |
| Beamsplitter | 208 | — | — | 36.000000 | AIR |
| Lens | 137 | 163.725000 | CX | 7.000000 | ACRYL |
| Img Src 1 | 84 | 40.000000 | CV | 42.360000 | AIR |
| Lens | 130 | 149.880000 | CX | 3.000000 | POLYC |
| " | 131 | 53.660000 | CV | 18.418400 | AIR |
| Lens | 132 | 110.449000 | CX | 7.000000 | ACRYL |
| " | 133 | 57.279000 | CX | 21.000000 | AIR |
| Mirror | 134 | — | — | 43.000000 | AIR |
| Lens | 135 | 316.793000 | CX | 4.000000 | ACRYL |
| " | 136 | 316.793000 | CX | 69.000000 | AIR |
| Lens | 137 | 163.725000 | CX | 7.000000 | ACRYL |
| " | 138 | 42.692000 | CX | 0.000000 | AIR |
| Lens | 139 | 42.692000 | CV | 2.000000 | POLYC |
| " | 140 | 135.158000 | CX | 130.000000 | AIR |
| Mirror | 141 | — | — | 114.000000 | AIR |
| Lens | 173 | 84.312000 | CX | 8.000000 | POLYC |
| " | 174 | 84.312000 | CX | 23.000000 | AIR |
| Mirror | 175 | — | — | 21.000000 | AIR |
| Lens | 176 | 34.836000 | CX | 5.000000 | ACRYL |
| " | 177 | — | — | 24.000000 | AIR |
| | 103 | — | — | — | — |

36. The apparatus of claim 22, wherein a second said arrangement of optical components comprising a corresponding one of said eyepiece means is refractive, said refractive eyepiece comprising a totally reflective plane mirror disposed in front of the observer's eye in the observer's line of sight and at least one lens disposed between the observer's eye and said plane mirror, said plane mirror and said lens disposed to present said intermediate real image into the observer's visual field, said intermediate real image occupying a portion of the observer's visual field having a minimum subtense of 20 degrees at the observer's eye, whereby said refractive eyepiece is optimized for viewing said low luminance superimposed image.

37. The apparatus of claim 36, wherein the effective focal length of said second coupling optic means together with said relay optic means optical components and said refractive eyepiece optical components is in the range of 15-55 millimeters.

38. The apparatus of claim 37, wherein said refractive eyepiece optical components are mounted in a goggle assembly, said refractive eyepiece goggle assembly disposed to releasably engage said relay optic means.

39. The apparatus of claim 22, wherein said first image source means includes an output image surface positioned for direct optical coupling of said first image source means image to said common relay optic means, said common relay optic means optical components including a plurality of lenses and a plane folding mirror, said catadioptric eyepiece optical components including at least one field lens, said catadioptric eyepiece optical components together with said first image source means output image surface and said common relay optic means optical components having the following optical prescription characteristics and inter-component spacing:

| Component Type | Surface No. | Radius (mm) | Curve Type | Thick/Dist (mm) | Mat'l |
|---|---|---|---|---|---|
| Img Src 1 | 84 | 40.000000 | CV | 61.863200 | AIR |
| Lens | 85 | 35.488000 | CX | 3.000000 | F4 |
| " | 86 | 21.770000 | CV | 1.792300 | AIR |
| Lens | 87 | 33.991000 | CX | 6.000000 | SIO2 |
| " | 88 | 85.875000 | CX | 21.905600 | AIR |
| Lens | 89 | 201.985000 | CV | 5.500000 | SIO2 |
| " | 90 | 24.617000 | CX | 5.209200 | AIR |
| Lens | 91 | 175.000000 | CX | 4.500000 | SIO2 |
| " | 92 | 54.941000 | CX | 1.433000 | AIR |
| Lens | 93 | 30.044000 | CV | 3.000000 | F4 |
| " | 94 | 384.855000 | CX | 34.294000 | AIR |
| Mirror | 95 | — | — | 19.000000 | AIR |
| Lens | 96 | 221.803000 | CV | 5.000000 | SIO2 |
| " | 97 | 74.673000 | CX | 81.356900 | AIR |
| Lens | 98 | 2000.000000 | CX | 5.000000 | ACRYL |
| " | 99 | 221.803000 | CV | 33.643100 | AIR |
| Beamsplitter | 100 | — | — | 34.801353 | AIR |
| Combiner | 101 | 128.165000 | CV | 35.941353 | AIR |
| Beamsplitter | 100 | — | — | 3.000000 | ACRYL |
| " | 102 | — | — | 51.420000 | AIR |
|  | 103 | — | — | — | — |

40. The apparatus of claim 22, wherein said first image source means includes an output image surface positioned for optical coupling of said first image source means image to said common relay optic means by said first optical coupling means, said common relay optic means optical components including a plurality of lenses and a plane folding mirror, said catadioptric eyepiece optical components including at least one field lens, said catadioptric eyepiece optical components together with said first image source means output image surface, said common relay optic means optical components and said first optical coupling means having the following optical prescription characteristics and inter-component spacing:

41. The apparatus of claim 15, wherein said common relay optic means optical components together with said first image source means and said beamsplitter means are mounted in a modular assembly, said relay modular assembly being attached to an outer surface of said helmet means.

42. The apparatus of claim 41, wherein said second image source means and a portion of said second coupling optic means from said second image source means up to said beamsplitter means are mounted in a modular assembly, said image intensifier modular assembly being attached to said relay modular assembly, whereby said image intensifier modular assembly is removed from said helmet means and said beamsplitter means is rotated out of the optical path from said first image source means to said first lens of said common relay optic means when the observer desires to view said virtual image superimposed on the observer's view of the external scene using said catadioptric eyepiece engaged to said common relay optic means.

43. The apparatus of claim 13, wherein the optical path length of said first or second coupling optic means together with said common relay optic means and any engaged one of said eyepiece means is a maximum of

| Component Type | Surface No. | Radius (mm) | Curve Type | Thick/Dist (mm) | Mat'l |
|---|---|---|---|---|---|
| Img Src 1 | 84 | 40.000000 | CV | 42.360000 | AIR |
| Lens | 130 | 149.880000 | CX | 3.000000 | POLYC |
| " | 131 | 53.660000 | CV | 18.418400 | AIR |
| Lens | 132 | 110.449000 | CX | 7.000000 | ACRYL |
| " | 133 | 57.279000 | CX | 21.000000 | AIR |
| Mirror | 134 | — | — | 43.000000 | AIR |
| Lens | 135 | 316.793000 | CX | 4.000000 | ACRYL |
| " | 136 | 316.793000 | CX | 69.000000 | AIR |
| Lens | 137 | 163.725000 | CX | 7.000000 | ACRYL |
| " | 138 | 42.692000 | CX | 0.000000 | AIR |
| Lens | 139 | 42.692000 | CV | 2.000000 | POLYC |
| " | 140 | 135.158000 | CX | 130.000000 | AIR |
| Mirror | 141 | — | — | 76.000000 | AIR |
| Lens | 142 | 65.596000 | CV | 4.200000 | ACRYL |
| " | 143 | 55.139000 | CX | 64.000000 | AIR |
| Beamsplitter | 144 | — | — | 25.300000 | AIR |
| Combiner | 145 | 135.158000 | CV | 26.500000 | AIR |
| Beamsplitter | 144 | — | — | 3.000000 | ACRYL |
| " | 146 | — | — | 47.000000 | AIR |
| " | 103 | — | — | — | — |

400 millimeters as measured either from said first or second image source means to the observer's eye.

44. The apparatus of claim 13, wherein said common relay optic means optical components are comprised of different optical materials so as to control chromatic abberrations of visible light.

45. The apparatus of claim 44, wherein said different optical materials include fused silica glass and F4 glass.

46. The apparatus of claim 44, wherein said different optical materials include acrylic and polycarbonate.

47. The apparatus of claim 13, wherein said common relay optic means optical components have spacing therebetween to allow folding of said optic means to conform to the contour of said helmet means.

* * * * *

UNITED STATES PATENT AND TRADEMARK OFFICE
CERTIFICATE OF CORRECTION

PATENT NO. : 4,961,626

DATED : October 9, 1990

INVENTOR(S) : Joseph T. Fournier, Jr. Stephen J. Smith
Harry R. McKinley and William E. McLean It is certified that error appears in the above-identified patent and that said Letters Patent is hereby corrected as shown below:

On the title page, item [73]:

Title page, Assignee, change "Techologies" to --Technologies--.

Column 15:

Claim 35, line 54, after "Img" insert --Src 2--.

Claim 35, line 55, delete "Src 2".

Claim 35, lines 63, 64 and 65 change

"Img     84        CV     42.360000        AIR     40.000000

Src 1".

to

--Img Src 1    84    40.000000    CV    42.360000 AIR--.

Signed and Sealed this

Eleventh Day of August, 1992

*Attest:*

DOUGLAS B. COMER

*Attesting Officer*     *Acting Commissioner of Patents and Trademarks*